United States Patent [19]

Matsumura et al.

[11] Patent Number: 4,670,843
[45] Date of Patent: Jun. 2, 1987

[54] CONTROL SYSTEM FOR CONTINUOUSLY VARIABLE TRANSMISSION

[75] Inventors: Toshio Matsumura; Katsunori Oshiage, both of Yokosuka, Japan

[73] Assignee: Nissan Motor Co., Ltd., Yokohama, Japan

[21] Appl. No.: 659,678

[22] Filed: Oct. 11, 1984

[30] Foreign Application Priority Data

Oct. 11, 1983 [JP] Japan .................................. 58-188475

[51] Int. Cl.$^4$ ...................... B60K 41/12; G06F 15/20
[52] U.S. Cl. .................................. 364/424.1; 74/866; 474/12; 474/18; 474/28; 364/165
[58] Field of Search ...................... 74/866, 867, 752 D; 364/424.1, 161, 164–165, 182; 474/11, 12, 18, 28, 70

[56] References Cited

U.S. PATENT DOCUMENTS

| | | | |
|---|---|---|---|
| 3,758,762 | 9/1973 | Littman et al. | 364/165 |
| 4,106,368 | 8/1978 | Ivey | 74/866 |
| 4,161,894 | 7/1979 | Giacosa | 474/28 |
| 4,509,125 | 4/1985 | Fattic et al. | 474/18 |
| 4,543,077 | 9/1985 | Yamamuro et al. | 474/12 |

FOREIGN PATENT DOCUMENTS 0090450 6/1982 Japan ........................................ 11/

*Primary Examiner*—Parshotam S. Lall
*Attorney, Agent, or Firm*—Schwartz, Jeffery, Schwaab, Mack, Blumenthal & Evans

[57] ABSTRACT

A control system for a continuously variable transmission wherein when a difference between an actual value and a target value is greater than a predetermined value, a feed-forward control is used, whereas when the difference is smaller than the predetermined value, a feedback control is used.

14 Claims, 7 Drawing Figures

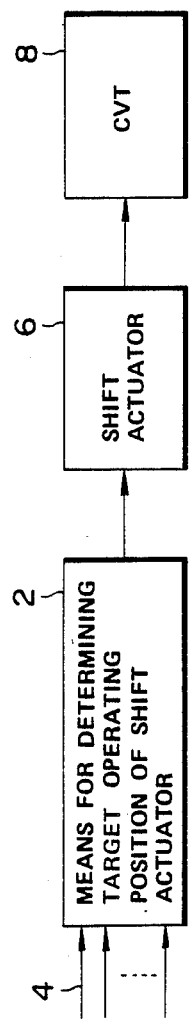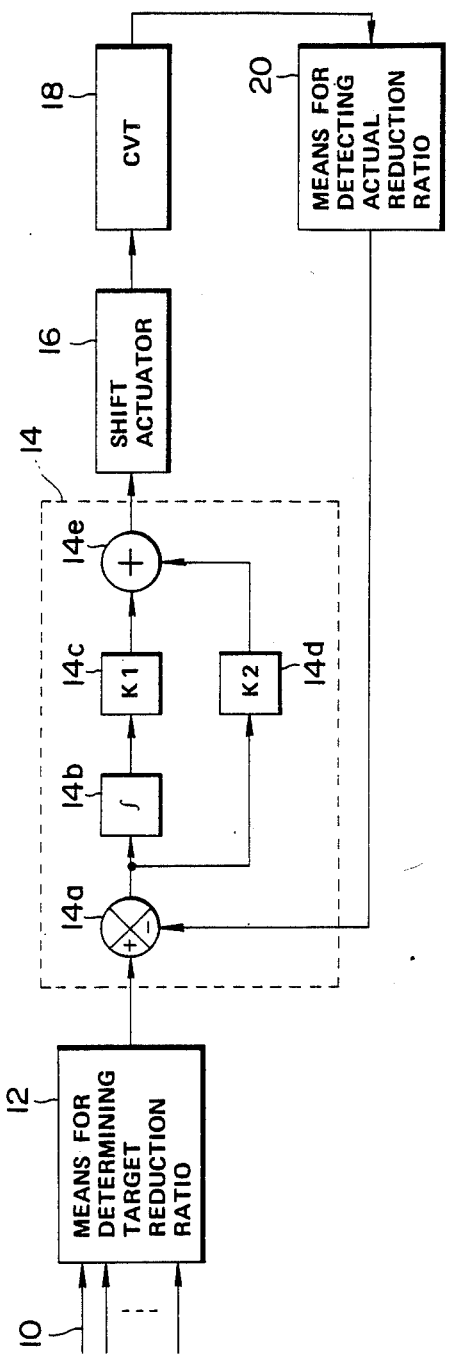
FIG.1 (PRIOR ART)
FIG.2 (PRIOR ART)

CONTROL SYSTEM FOR CONTINUOUSLY VARIABLE TRANSMISSION

BACKGROUND OF THE INVENTION

The present invention relates to a control system for a continuously variable transmission.

As a conventional control system for a continuously variable transmission, there have been proposed two types, one being an open-loop type, the other being a feed-back type.

In FIG. 1, there is shown a conventional system for a continuously variable transmission of the open-loop type. Means 2 for determining operating position of shift actuator determines a signal which instructs an operating position of a shift actuator 6 based on various kinds of signals 4 representative of an operating state of a vehicle, and it outputs the signal to the shift actuator 6. In accordance with this signal, the shift actuator 6 adjusts an actual reduction ratio in a continuously variable transmission 8 to the state instructed.

However, according to the control system of the open-loop type wherein the operating position of the shift actuator is determined and the shift actuator is adjusted to this operating position, there is an error in reduction ratio owing to dispersion and looseness of mechanical parts interconnecting the shift actuator and the shfit control valve and hysteresis of the shift control valve.

In FIG. 2, a conventional control system for a continuously variable transmisson of the feed-back type is shown. This control system comprises a means 12 for determining a target reduction ratio based on various kinds of signals 10 representative of an operating state of a vehicle, a feed-back control means 14 for generating a shift command signal carrying instructions to establish the target reduction ratio determined by the means 12 for determining target reduction ratio, a shift actuator 16 operable on the shift command signal, a continuously variable transmission 18 where a reduction ratio is controlled in response to action of the shift actuator 16, and a means 20 for detecting an actual reduction ratio in the continuously variable transmission 18. The feed-back control means 14 is constructed as follows. A difference between the target reduction ratio generated by the means 12 for determining target reduction ratio and the actual reduction ratio generated by the means 20 for detecting actual reduction ratio is obtained by an arithmetic unit 14a, this difference is integrated at an integrator 14b and then this integrated value is multiplied with a predetermined integral control gain K1 at a multiplier 14c. On the other hand, this difference obtained at the arithmetic unit 14a is multiplied with a predetermined proportional control gain K2 at a multiplier 14d. The values obtained at the multipliers 14c and 14d are added to each other at an adder 14e and the result is output to the shift actuator 16.

However, according to this control system of the feed-back type, since the shift command signal is determined based only on the difference between the target reduction ratio and the actual reduction ratio, if large control gains (K1, K2) are set for the feed-back control, hunting takes place during rapid acceleration when the difference between the target reduction ratio and the actual reduction ratio is large, and on the contrary if small control gains are set, the response becomes poor.

SUMMARY OF THE INVENTION

An object of the present invention is to provide a control system for a continuously varible transmission wherein an error in reduction ratio can be corrected and a good response is provided without causing hunting.

The above mentioned object is accomplished according to the present invention by effecting a switch in response to the operating condition to selectively use a feed-back control or an feed-forward (or open-loop) control.

According to one aspect of the present invention, a control system for a continuously variable transmission for a vehicle having an engine wherein a reduction ratio is determined in response to an operating position of a shift actuator that is operable on a shift command signal, comprising:

means for determining a feed-forward control value in response to a target operating position of the shift actuator obtained in a predetermined manner based on various kinds of signals representative of an operating state of the vehicle and generating a feed-forward control value indicative signal;

means for determining a target value responsive to said target operating position of the shift actuator and generating a target value indicative signal;

means for detecting a feed-back value which is variable in response to a change in the operating position of the shift actuator and generating a feed-back value indicative signal;

means for determining a feed-back control value as a function of the difference between said target value indicative signal and said feed-back value indicative signal;

means for deciding which of feed-forward control and feed-back control is to be executed based on said difference between said target value indicative signal and said feed-back value indicative signal; and means for supplying said feed-back control value indicative signal, as the shift command signal, to the shift actuator when said means for deciding which of feed-foward and feed-back control to be executed instructs that the feed-back control be executed, and supplying said feed-forward control value indicative signal, as the shift command signal, to the shift actuator when said means for deciding which of feed-forward and feed-back control to be executed instructs that the feed-forward control be executed.

According to another aspect of the present invention, a control system for a continuously variable transmission for a vehicle wherein a reduction ratio is determined in response to an operating position of a shift actuator that is operable on a shift command signal, comprising:

means for determining a feed-forward control value in response to a target operating position of a shift actuator determined in a predetermined manner based on various kinds of signals representative of an operating state of the vehicle and generating a feed-forward control value indicative signal;

means for determining a target value corresponding to the target operating position of the shift actuator and generating a target value indicative signal;

means for detecting a feed-back value which is variable in response to a change in the operating position of the shift actuator and generating a feed-back value indicative signal;

means for determining a feed-back control value as a function of the difference between said target value indicative signal and said feed-back value indicative signal;

means for adding said feed-forward control value indicative signal to said feed-back control value indicative signal to result in a summation and generating a summary value indicative signal;

means for deciding which of feed-forward control and feed-back control is to be executed based on said target value indicative signal and said difference between said feed-back value indicative signal; and means for supplying said summation indicative signal, as the shift command signal, to the shift actuator when said means for deciding which of feed-forward and feed-back control to be executed instructs that the feed-back control be executed decreasing said feed-forward control value indicative signal to zero, and supplying said feed-forward control value indicative signal, as the shift command signal, to the shift actuator when said means for deciding which of feed-forward and feed-back control to be executed instructs that the feed-forward control be executed.

BRIEF DESCRIPTION OF THE DRAWINGS

FIG. 1 is a block diagram showing the above discussed conventional control system of the feed-forward (open-loop) type;

FIG. 2 is a block diagram showing the above discussed control system of the feed-back (closed-loop) type;

DESCRIPTION OF THE EMBODIMENTS

Hereinafter, the present invention is described in connection with various embodiments thereof shown in FIGS. 3 to 7 of the accompanying drawings.

First Embodiment

Figure 3:
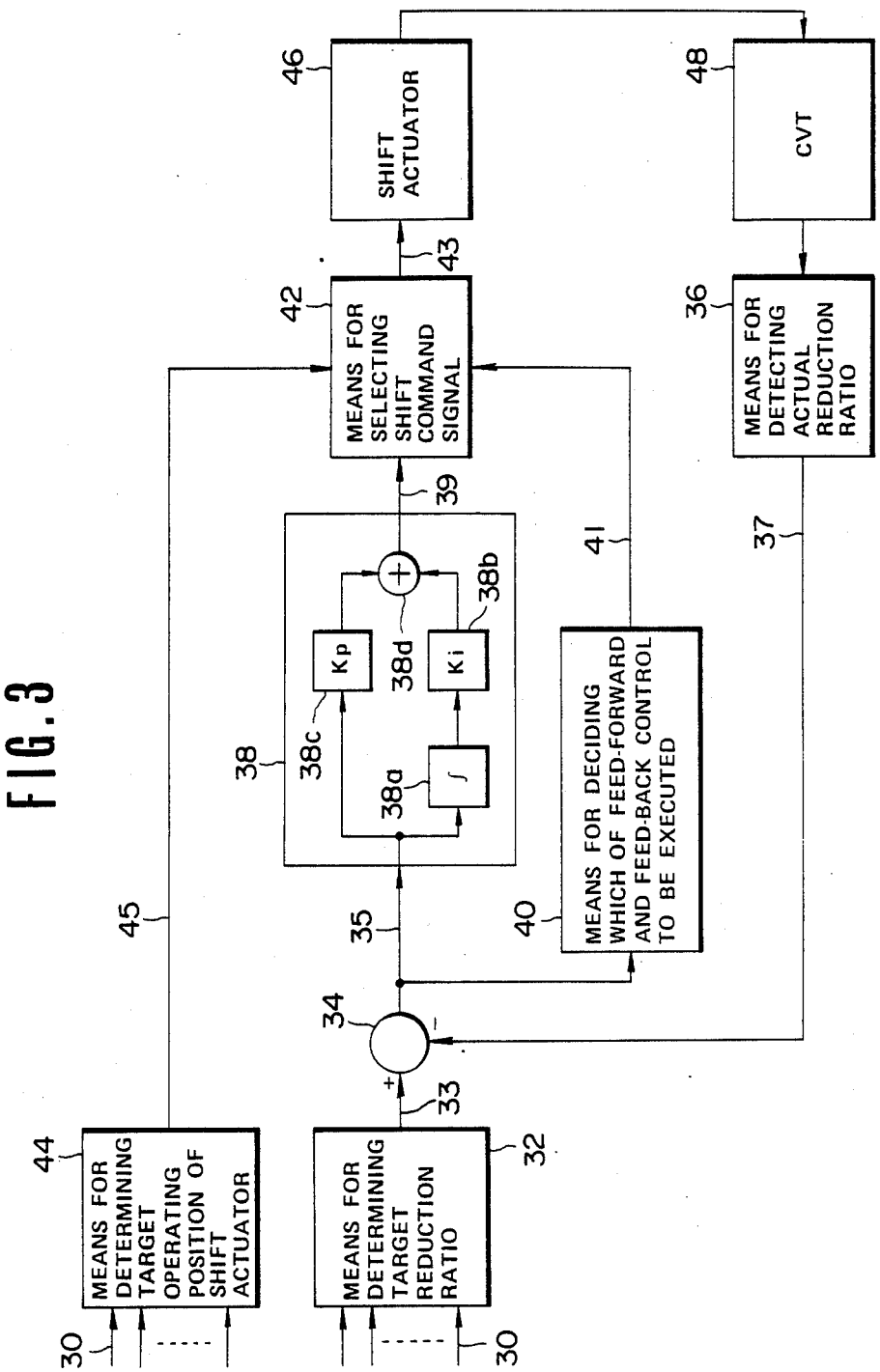
FIG. 3 is a block diagram showing a first embodiment according to the present invention.

FIG. 3 shows a first embodiment according to the present invention. Various kinds of signals 30 indicative of an operating state of a vehicle are fed to a means 32 for determining a target reduction ratio wherein, based on these various kinds of signals 30, a target reduction ratio is determined. The target reduction ratio varies in a predetermined shift pattern representing reduction ratios to be established in a continuously variable transmission which allows an engine to always operate on a least fuel consumption curve thereof. An output signal 33 indicative of the target reduction ratio that has been determined by the means 32 for determining target reduction ratio is fed to a difference computing means 34 where arithmetic operation is performed to provide a difference from a signal 37 indicative of an actual reduction ratio from a later described means 36 for detecting actual reduction ratio. A signal 35 indicative of the difference between the target reduction ratio and the actual reduction ratio is fed to a feed-back control means 38 and also to means 40 for deciding which of feed-forward and feed-back control to be executed. In the feed-back control means 38, the following operation is performed. The signal 35 indicative of the difference is integrated by an integrator 38a and the integrated value is multiplied with an integral control gain Ki at a multiplier 38b. On the other hand, the signal 35 indicative of the difference is fed to another multiplier 38c where it is multiplied with a proportional control gain Kp. The results obtained at the multiplers 38b and 38c are added to each other at an adder 38d and the result is fed to a means 42 for selecting shift command signal in terms of a signal 39. In the means 40 for deciding which of feed-forward and feed-back control to be executed, a decision is made whether the difference indicated by the signal 35 is greater than a predetermined value or not, and if the difference is greater than the predetermined value, a signal 41, i.e., a feed-forward instruction signal, is generated, while if the difference is not greater than the predetermined value, the signal 41 switches to a feed-back instruction signal. The signal 41 is fed to the means 42 for selecting a shift command signal. On the other hand, a means 44 for determining a target operating position of the shift actuator determines, based on the various kinds of signals 30 representative of the operating state of the vehicle, and feeds a signal 45 instructing a predetermined operating position of the shift actuator to the means 42 for selecting a shift command signal. In the means 42 for selecting shift command signal, when the signal 41 is the feed-forward instruction signal, the signal 45 is fed as a shift command signal 43 to a shift actuator 46, whereas when the signal 41 is the feed-back control instruction signal, the signal 39 is fed as the shift command signal 43 to the shift actuator 46. Based on the shift command signal 43, the shift actuator 46 is operable and an actual reduction ratio in a continuously variable transmission 48 is varied by the operation of the shift actuator 46. The actual reduction ratio in the continuously variable transmission 48 is detected by the means 36 for detecting the actual reduction ratio, and the signal 37 indicative of the actual reduction ratio is fed to the difference computing or arithmetic means 34 in the previously mentioned manner.

According to the above mentioned control strategy, therefore, if the difference between the target reduction ratio and the actual reduction ratio is less than a predetermined value, the feed-back control is executed whereby the difference is reduced toward zero. In this case, since the signal 35 indicative of the difference that is fed to the feed-back control means 38 is always less than a predetermined value, hunting does not take place even if large control gains (Kp, Ki) for the feed-back control are set. If the difference is larger than the predetermined value, the signal 45 from the means 44 for determining the target operating position of shift actuator is fed as the shift command signal 43 to the shift actuator 46, so that the shift actuator 46 shifts quickly to the instructed operating position.

Second Embodiment

Figure 4:
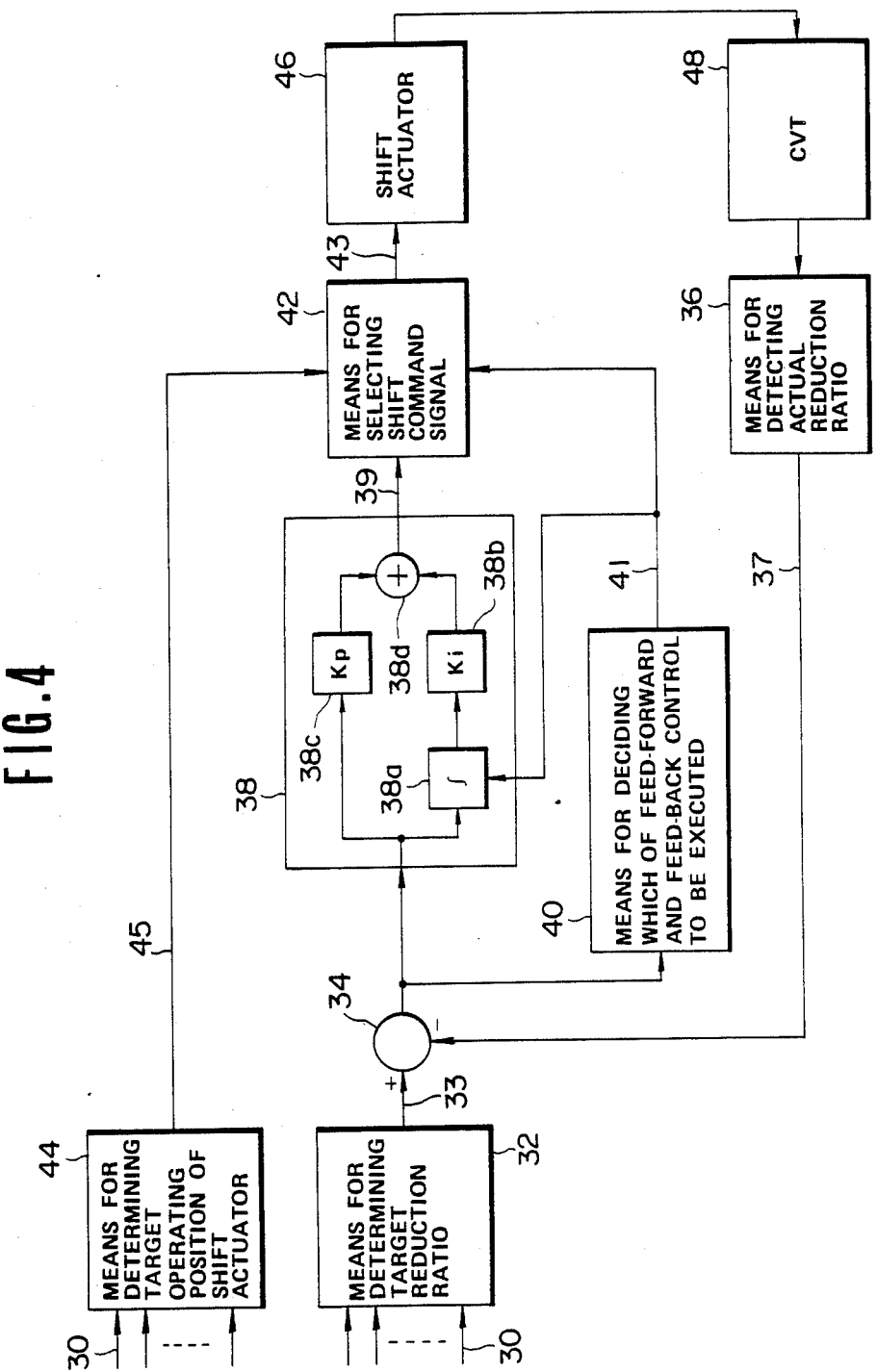
FIG. 4 is a block diagram showing a second embodiment according to the present invention.

FIG. 4 shows a second embodiment according to the present invention. The difference in this second embodiment from the first embodiment resides in that a signal 41, from a means 40 for deciding which of feed-forward and feed-back control is to be executed, is fed to the integrator 38a of a feed-back control means 38. Feeding this signal 41 functions to reset the integrator 38a to an initial state thereof (for example, a state where the integral value is zero). This circuit arrangement prevents an accumulation of errors.

Third Embodiment

Figure 5:
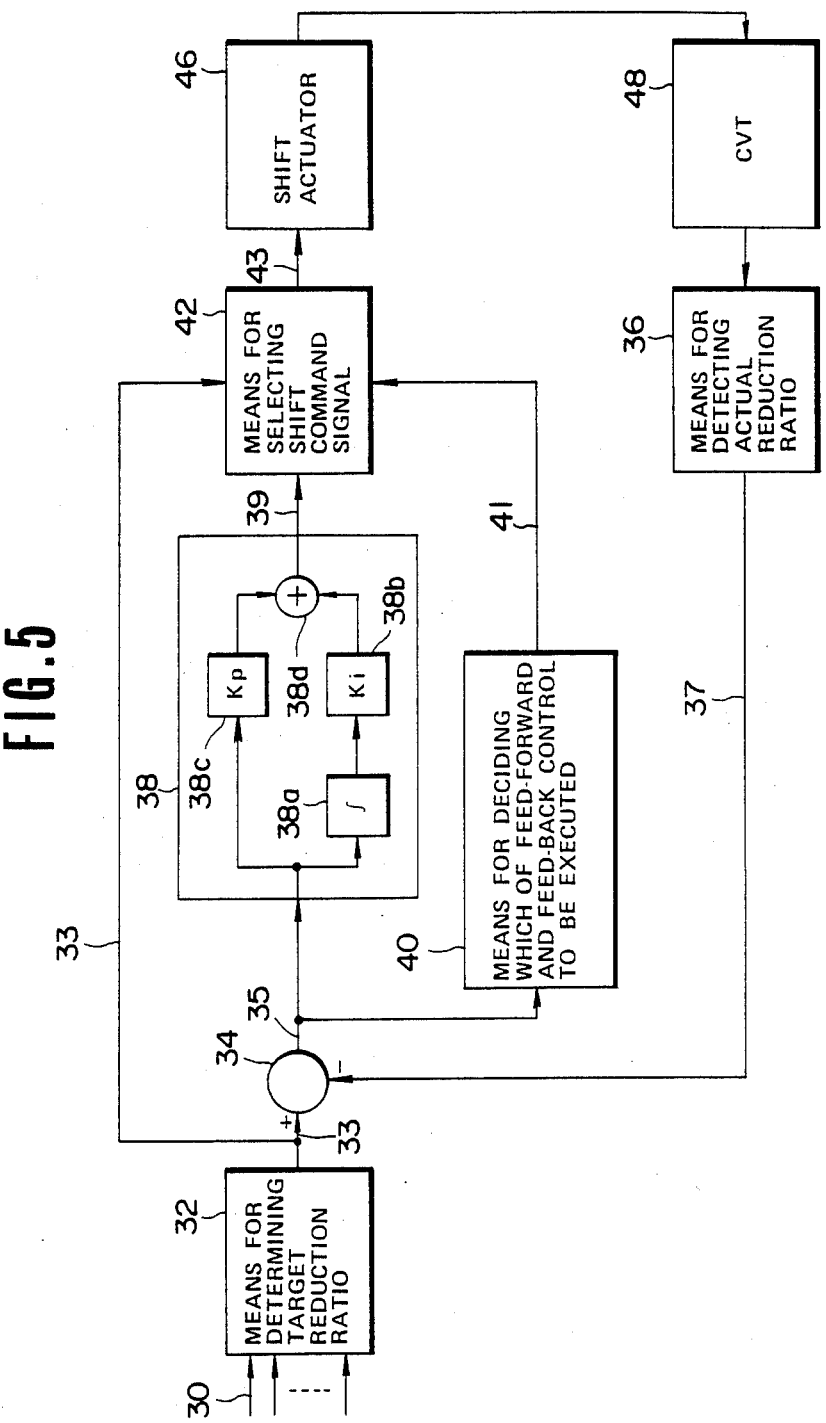
FIG. 5 is a block diagram showing a third embodiment according to the present invention.

FIG. 5 shows a third embodiment according to the present invention. In this embodiment, the signal 45 of the first embodiment has been replaced with a target reduction ratio signal 33 from a means 32 for determining target reduction ratio. The other construction is substantially the same as the counterpart in the first embodiment shown in FIG. 3. In this case, the signal 33 serves not only as a target reduction ratio signal, but also as a feed-forward control signal. In this embodiment, too, substantially the same operation and effect as those of the first embodiment are obtained.

Fourth Embodiment

Figure 6:
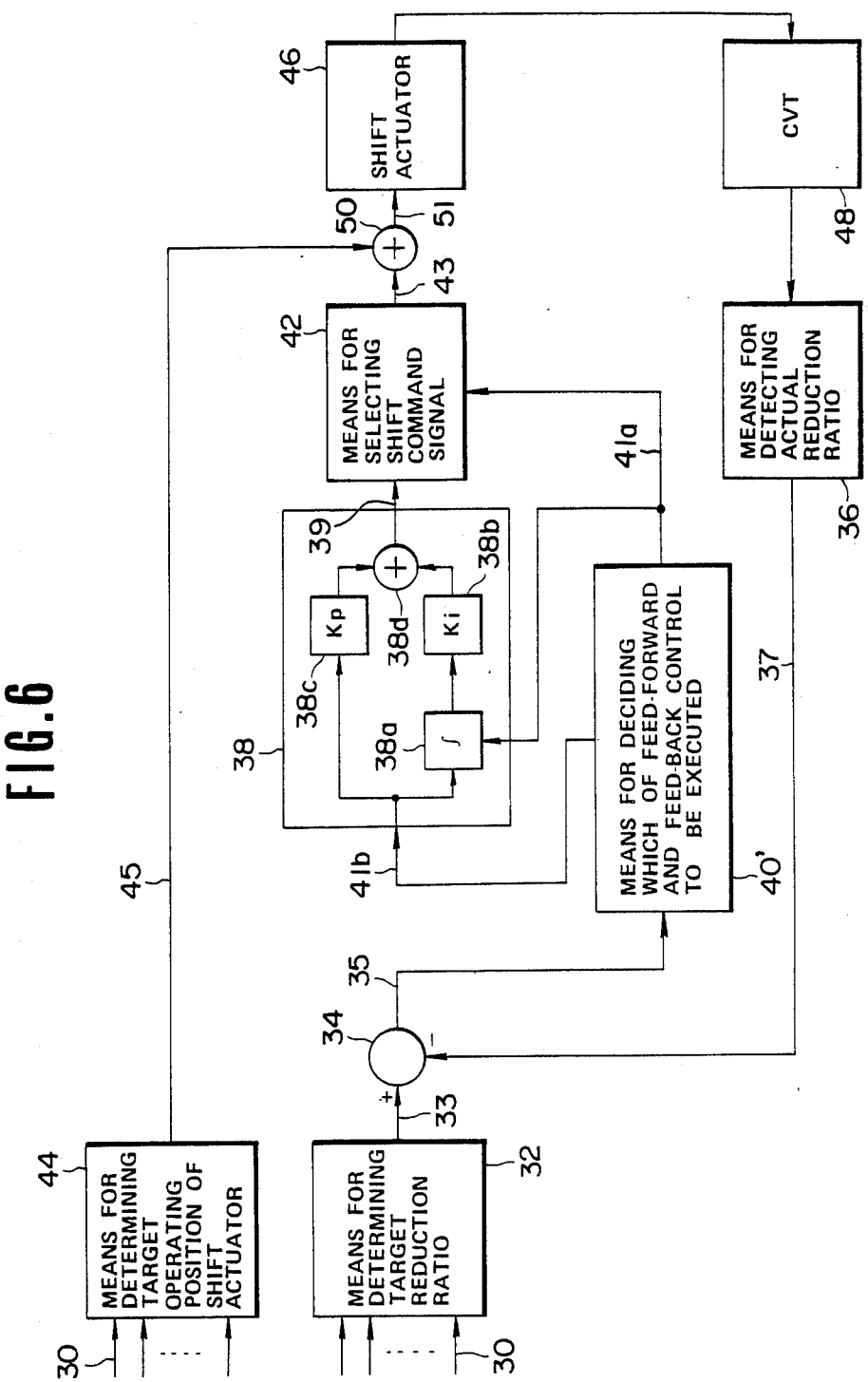
FIG. 6 is a blcok diagram showing a fourth embodiment according to the present invention.

FIG. 6 shows a fourth embodiment. Most elements of the construction of this fourth embodiment are substantially the same as the counterparts in the first embodiment shown in FIG. 3 and thus like reference numerals are used to denote like parts throughout these Figures, and thus the following description concentrates mainly on a portion different from the first embodiment. A means 40' for deciding which of the feed-forward and feed-back controls is to be executed decides based on a signal 35 indicative of a difference between a desired reduction ratio and an actual reduction ratio whether a feed-back control is to be executed or not. That is, if the difference is greater than a predetermined value, a zero level output signal 41a is fed to the feed-back control means 38 and to the means 42 for selecting the shift command signal, which signal indicates instructions that feed-back control need not be executed. If the difference is less than the predetermined value, the difference indicative signal 35 is fed to the feed-back control means 38 in terms of a signal 41b. When the signal 41b is generated by the means 40' for deciding which of feed-forward and feed-back control is to be executed, the feed-back control means 38 delivers to the means 42 for selecting the shift command signal carrying instructions indicating that the difference should be reduced to zero, and the means 42 for selecting the shift command signal feeds this signal 39 to an adder 50 as a signal 43. Also fed to the adder 50 is a signal 45 from a means 44 for determining the target operating position of shift actuator. These signals 43 and 45 are added to each other to result in a summation and the result is fed to a shift actuator 46 as a shift command signal 51. Based on this signal 51, the shift actuator 46 operates to vary the reduction ratio in the continuously variable transmission 48. In this manner, the actual reduction ratio is made to agree with the target reduction ratio. If zero output signal 41a is generated by the means 40' for deciding which of the feed-forward and feed-back controls is to be executed, the means 42 for selecting the shift command signal is switched by the signal 41a to a state where a zero output is generated as the signal 43. In this case, since the signal 43 indicating zero output and the signal 45 are added to each other, the signal 51 indicative of the summation result becomes equal to the signal 45. That is, in this case the open loop or feed-forward control in accordance with instructions by the means 44 for determining target operating position of shift actuator is executed. The zero output signal 41a from the means 40' for deciding which of feed-forward and feed-back control to be executed is also applied to an integrator 38a, thus resetting the integral value to an initial state (for example, zero).

In the fourth embodiment shown in FIG. 6, if the difference between the target reduction ratio and the actual reduction ratio is greater than the predetermined value, the shift actuator 46 is feed-forward controlled in accordance with the signal 45 from the means 44 for determining the target operating position of shift actuator, whereas if the difference is less than the predetermined value, the shift actuator 46 is feed-back controlled in accordance with the summation resulting from adding the shift command signal from the feed-back control means 38 to the signal 45. Therefore, even if large control gains (Kp, Ki) are set in the feed-back control means 38 similarly to the embodiment shown in FIG. 3, hunting does not take place, thus poroviding a good response characteristic.

Although, in the first to fourth embodiments as mentioned above, the reduction ratio has been a controlled objective, the control objective may be engine revolution speed. In this case, only by replacing the means 32 for determining target reduction ratio used in FIGS. 3 to 6 with a means for determining a target engine revolution speed and the means 36 for detecting actual reduction ratio with a means for detecting actual engine revolution speed, substantially the same operation and effect are obtained with the engine revolution speed as the control objective.

Figure 7:
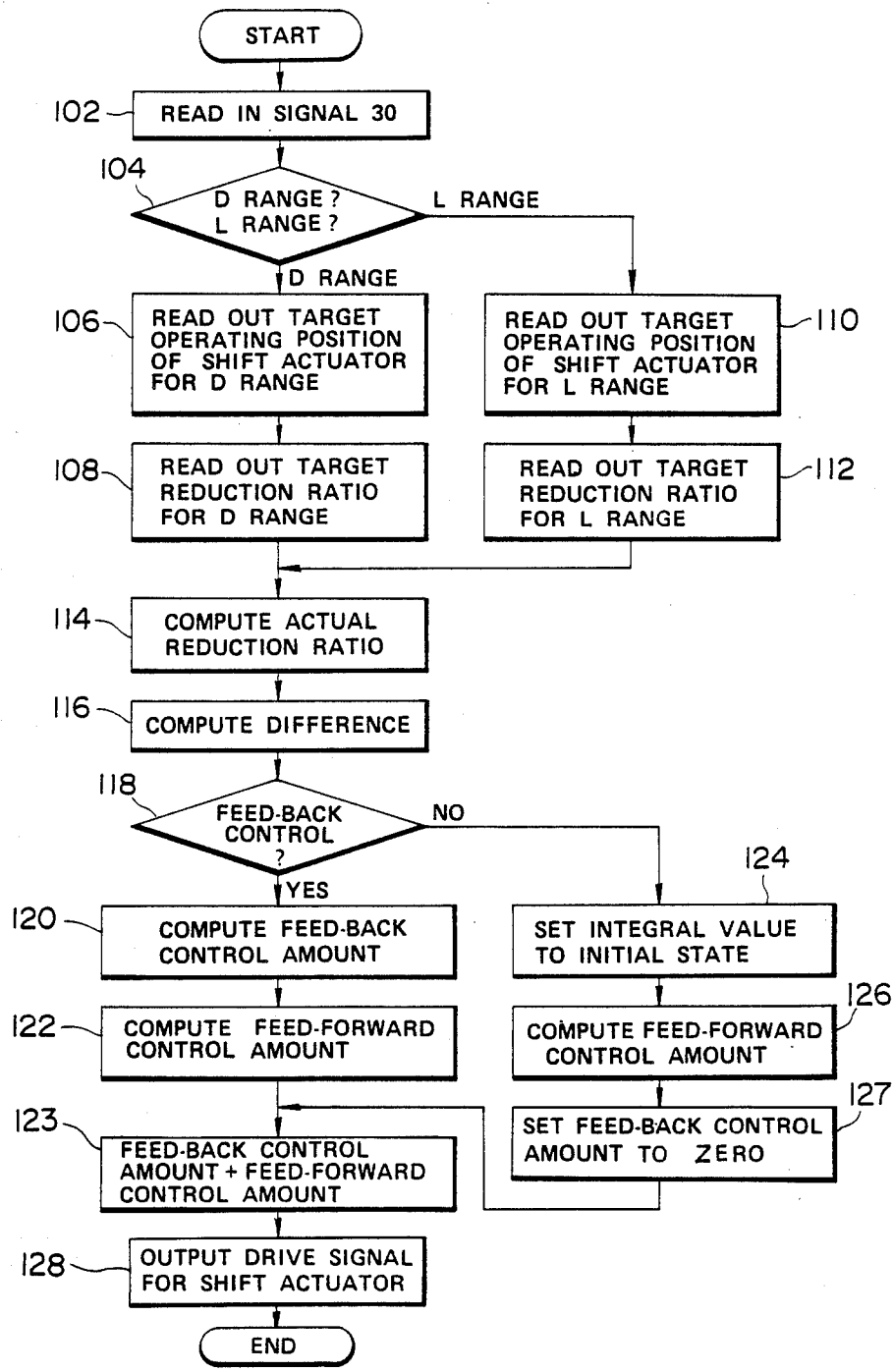
FIG. 7 is a flowchart showing the control strategy of the embodiment shown in FIG. 6.

The above described first to fourth embodiments may be embodied using a microcomputer. For example, a flowchart of a control corresponding to the fourth embodiment is shown in FIG. 7. Various kinds of signals 30 representative of an operating state of a vehicle are read in (in step 102), a determination is made whether a select lever is placed at D range or L range (in step 104). If it is at D range, a target operating position of shift actuator for D range is read out (in step 106) and a target reduction ratio for D range is read out (in step 108). When it is at L range, a target operating position of a shift actuator for L range is read out (in step 110) and a target reduction ratio for L range is read out (in step 112). In step 114, an actual reduction ratio is computed and a difference between the target reduction ratio and the actual reduction ratio is computed. And a determination is made whether a feed-back control is to be executed or not (in step 118) in response to the difference obtained in step 116. If the feed-back control is found to be executed (i.e., the difference is less than the predetermined value), a feed-back control amount is computed (in step 120), a feed-forward control amount is computed (in step 122), the feed-back control amount is added to the feed-forward control amount (in step 123) and the result is output to the shift actuator (in step 128). If it is determined that feed-back control is not to be executed in step 118 (i.e., if the difference is greater than the predetermined value), the control proceeds to a step 124 where the integral value in the feed-back control means 38 is set to an initial state, and a feed-forward control amount is computed in step 126, a feed back control amount is set to zero (in step 127), the feed-back control amount is added to the feed-forward control amount (in step 123), and the result is fed to the shift actuator (in step 128). Arrarently, the control carried out in the fourth embodiment shown in FIG. 6 is executed by a control along this flowchart shown in FIG. 7. Although specific description is omitted, with flowcharts similar to the one shown in FIG. 7, controls of the embodiments shown in FIGS. 3 to 5 can be carried out.

What is claimed is:

1. A control system for a continuously variable transmission for a vehicle having an engine wherein a reduction ratio is determined in response to an operating position of a shift actuator that is operable on a shift command signal, comprising:
   means for producing a feed-forward control value indicative signal representative of a target operating position of the shift actuator;
   means for producing a target value indicative signal representative of a target operating position of the shift actuator;
   means for producing a feed-back value which is variable in response to a change in the operating position of the shift actuator and generating a feed-back value indicative signal;
   means for determining a feed-back control value as a function of a difference between said target value indicative signal and said feed-back value indicative signal;
   means for deciding whether feed-forward control or feed-back control is to be executed based on said difference between said target value indicative signal and said feed-back value indicative signal; and
   means for supplying said feed-back control value indicative signal, as a shift command signal, to the shift actuator when said deciding means decides that the feed-back control is to be executed, and supplying said feed-forward control value indicative signal, as the shift command signal, to the shift actuator when said deciding means decides that the feed-forward control is to be executed.

2. A control system as claimed in claim 1, wherein said feed-forward control value indicative signal is the same as said target value indicative signal.

3. A control system as claimed in claim 1, wherein said target value indicative signal is produced based on a target engine revolution speed of the engine, said feed-back value indicative signal is produced based on an actual engine revolution speed of the engine, said deciding means decides that the feed-forward control is to be executed when a difference between the target engine revolution speed and the actual engine revolution speed is greater than a predetermined value and decides that the feed-back control be executed when said difference is less than the predetermined value.

4. A control system as claimed in claim 1, wherein said target value indicative signal is generated based on a desired target reduction ratio in the continuously variable transmission, the feed-back value indicative signal is generated based on an actual reduction ratio in the continuously variable transmission, said deciding means decides that the feed-forward control is to be executed when a difference between the target reduction ratio and the actual reduction ratio is greater than a predetermined value and decides that the feed-back control be executed when said difference is less than the predetermined value.

5. A control system as claimed in claim 1, wherein said feed-back control value determining means is reset to a predetermined initial state when said deciding means decides that the feed-forward control is to be executed.

6. A control system as claimed in claim 5, wherein said target value indicative signal is produced based on a target engine revolution speed of the engine, said feed-back value indicative signal is produced based on an actual engine revolution speed of the engine, said deciding means decides that the feed-forward control is to be executed when a difference between the target engine revolution speed and the actual engine revolution speed is greater than a predetermined value and decides that the feed-back control is to be executed when said difference is less than the predetermined value.

7. A control system as claimed in claim 5, wherein said target value indicative signal is produced based on a target reduction ratio in the continuously variable transmission, the feed-back value indicative signal is produced based on an actual reduction ratio in the continuously variable transmission, said deciding means decides that the feed-forward control is to be executed when a difference between the target reduction ratio and the actual reduction ratio is greater than a predetermined value and decides that the feed-back control is to be executed when said difference is less than the predetermined value.

8. A control system for a continuously variable transmission for a vehicle wherein a reduction ratio is determined in response to an operating position of a shift actuator that is operable on a shift command signal, comprising:
   means for producing a feed-forward control value indicative signal representative of a target operating position of said shift actuator;
   means for producing a target value indicative signal representative of a target operating position of the shift actuator;
   means for detecting a feed-back value which is variable in response to a change in operating position of the shift actuator and generating a feed-back value indicative signal;
   means for determining a feed-back control value as a function of a difference between said target value indicative signal and said feed-back value indicative signal;
   means for adding said feed-forward control value indicative signal to said feed-back control value indicative signal and generating a summation indicative signal;
   means for deciding whether feed-forward control or feed-back control is to be executed based on said difference between said target value indicative signal and said feed-back value indicative signal; and
   means for supplying said summation indicative signal, as the shift command signal, to the shift actuator when said deciding means decides that the feed-back control is to be executed, and supplying said feed-forward control value indicative signal, as the shift command signal, to the shift actuator when said deciding means decides that the feed-forward control is to be executed.

9. A control system as claimed in claim 8, wherein said feed-back control value determining means is reset to a predetermined initial state when said deciding means decides that the feed-forward control is to be executed.

10. In a control, system for a continuously variable transmission for a vehicle, the control system having a target value variable with a target reduction ratio determined based on various input signals representative of an operating state of the vehicle, a shift actuator operable in response to a shift command signal to cause a shift in reduction ratio of the continuously variable transmission, a feed-back value variable with the actual reduction ratio;

means for comparing the feed-back value with the target value and producing a difference therebetween;

means for supplying a feed-forward signal as said shift command signal in order to effect a feed-forward control of the shift actuator to cause a shift in reduction ratio thus reducing said difference towards zero when said difference is greater than a predetermined value; and means for supplying a signal indicative of said difference as said shift command signal in order to effect a feed-back control of the shift actuator to cause a shift in reduction ratio thus reducing said difference toward zero when said difference is at or less than predetermined value.

11. A control system as claimed in claim 10, wherein said feed-forward control effecting means modifies the shift command signal to produce a predetermined target reduction ratio.

12. A control system as claimed in claim 10, wherein said feed-back control effecting means modifies the shift command signal in response to said difference in a direction to reduce said difference toward zero, and said feed-forward control effecting means causes the modification of the shift command signal due to said feedback control effecting means to be zero when said difference is at or less than said predetermined value.

13. A control system as claimed in claim 10, wherein said feed-forward control effecting means modifies the shift command signal to cause a target operating position to be assumed by the shift actuator.

14. A control system as claimed in claim 13, wherein said feed-back control effecting means includes an integrator, and said feed-forward control effecting means resets said integrator.

* * * * *